United States Patent [19]

Azzaroni

[11] Patent Number: 5,109,649
[45] Date of Patent: May 5, 1992

[54] COMPACT AUTOMATIC MACHINE FOR EMPTYING AND RELOADING FILM FROM AND INTO X-RAY CASSETTES

[75] Inventor: Cesare Azzaroni, Bologna, Italy

[73] Assignee: C.M.A. S.r.l., Bologna, Italy

[21] Appl. No.: 317,283

[22] Filed: Feb. 28, 1989

[30] Foreign Application Priority Data

Mar. 9, 1988 [IT] Italy ................. 3363 A/88

[51] Int. Cl.⁵ ............................................. B65B 1/00
[52] U.S. Cl. ............................ 53/284.4; 53/382.1; 414/411
[58] Field of Search .............. 414/411, 403, 404, 416; 53/381 R, 385, 382.1, 284.4

[56] References Cited

U.S. PATENT DOCUMENTS

| | | | |
|---|---|---|---|
| 3,888,587 | 6/1975 | Perl | 414/411 X |
| 4,354,336 | 10/1982 | Azzaroni | 414/411 |
| 4,514,958 | 5/1985 | Hoorn | 414/403 X |
| 4,539,794 | 9/1985 | Azzaroni | 414/411 X |
| 4,553,369 | 11/1985 | Debes et al. | 414/411 X |
| 4,577,452 | 3/1986 | Hösel et al. | 414/411 X |
| 4,590,738 | 5/1986 | Hösel et al. | 414/411 X |
| 4,692,083 | 9/1987 | LeRoux et al. | 414/411 |
| 4,759,679 | 7/1988 | Müller | 414/416 |
| 4,775,138 | 10/1988 | Müller | 414/411 X |
| 4,783,588 | 11/1988 | Schmidt et al. | 414/411 X |
| 4,788,810 | 12/1988 | Bauer et al. | 414/411 X |

Primary Examiner—Robert P. Olszewski
Assistant Examiner—Cheryl L. Gastineau
Attorney, Agent, or Firm—Browdy and Neimark

[57] ABSTRACT

The machine comprises a first station to and from which cassettes are admitted and ejected in single succession, and a second station with mechanically interconnected and simultaneously operated devices, including a first pair serving to open and shut the cassette on the one hand, and a magazine from which new film is dispensed, on the other, and a further pair by which single sheets of exposed and new film are picked up and transferred from the cassette to a collection point, located inside the machine, and from the magazine to the cassette, respectively; another mechanism connects the bay occupied by the magazine with that occupied by the cassette, and permits of adjusting the dimensions of the cassette bay to suit a different size of magazine simply by positioning the magazine between front and rear transverse stops.

13 Claims, 9 Drawing Sheets

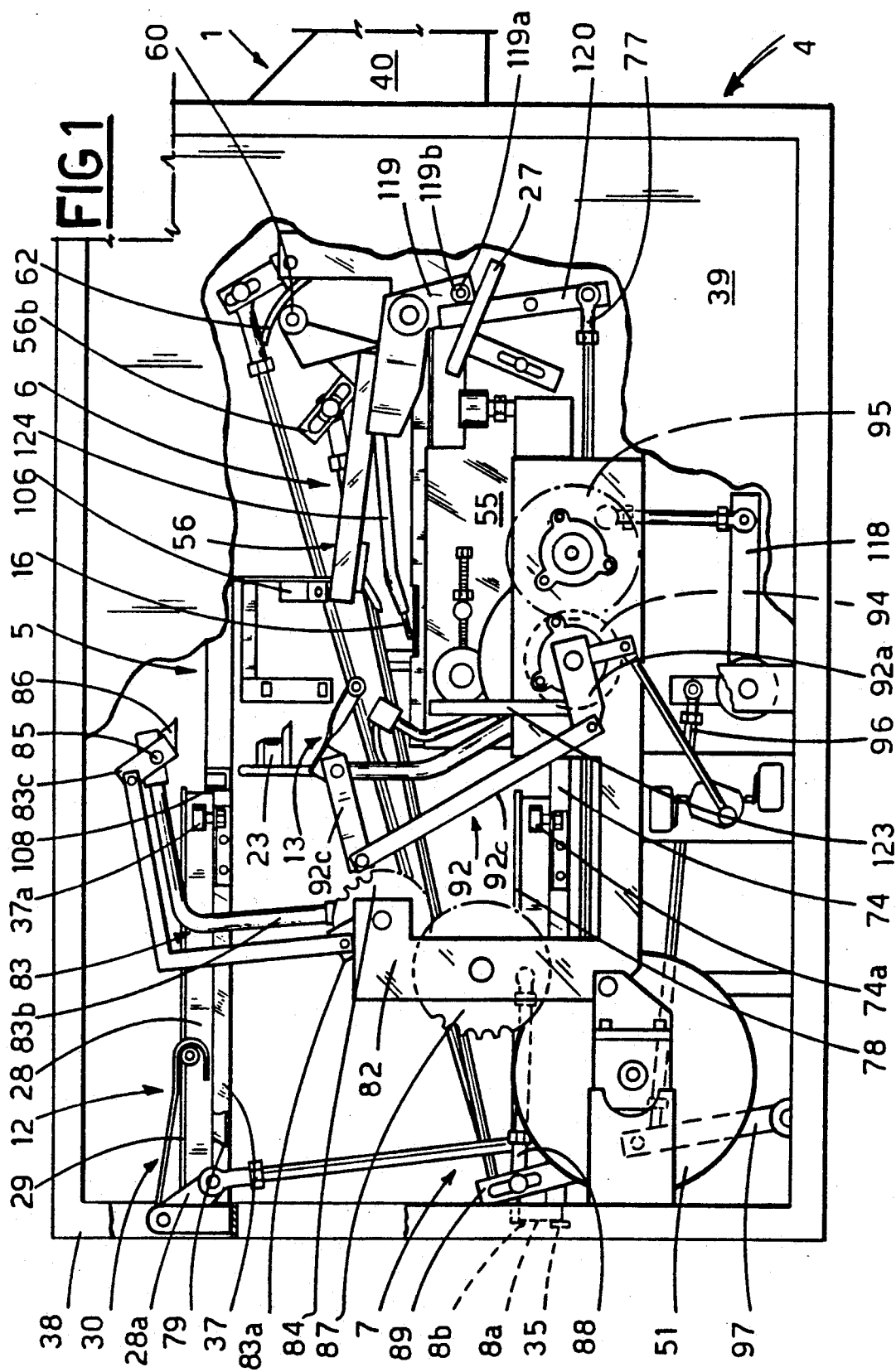

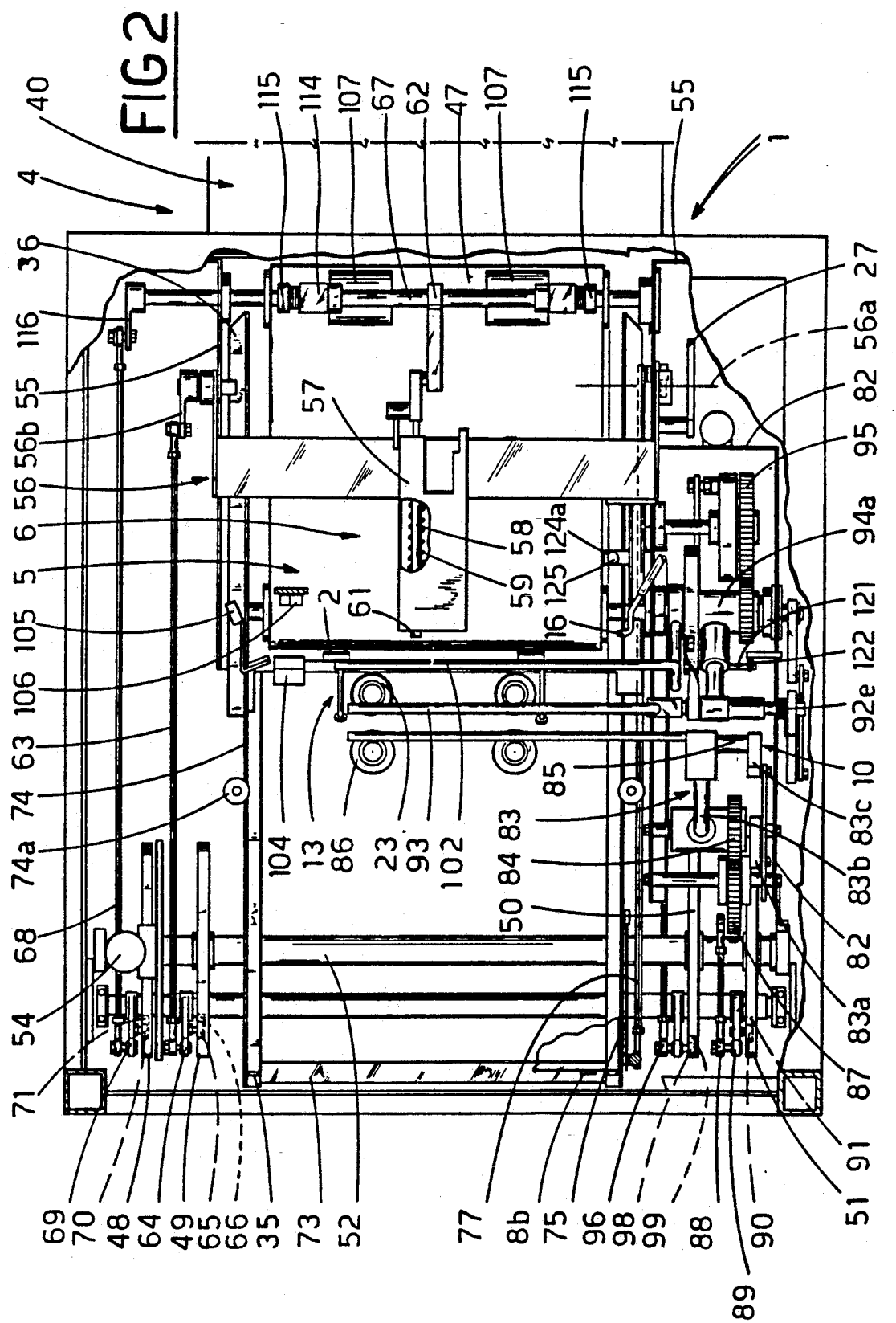

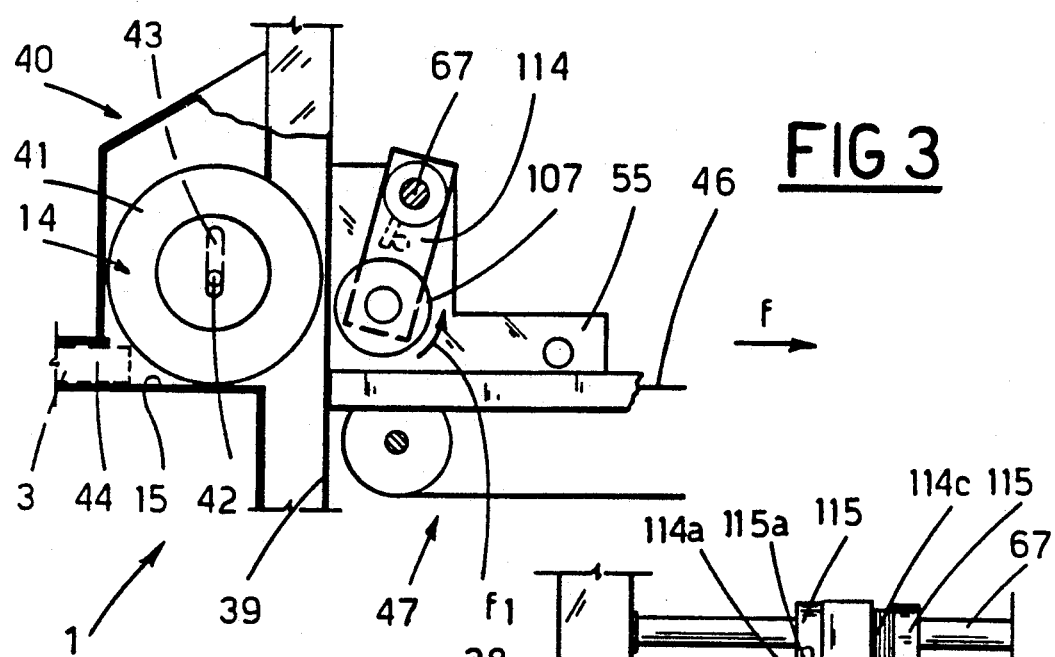
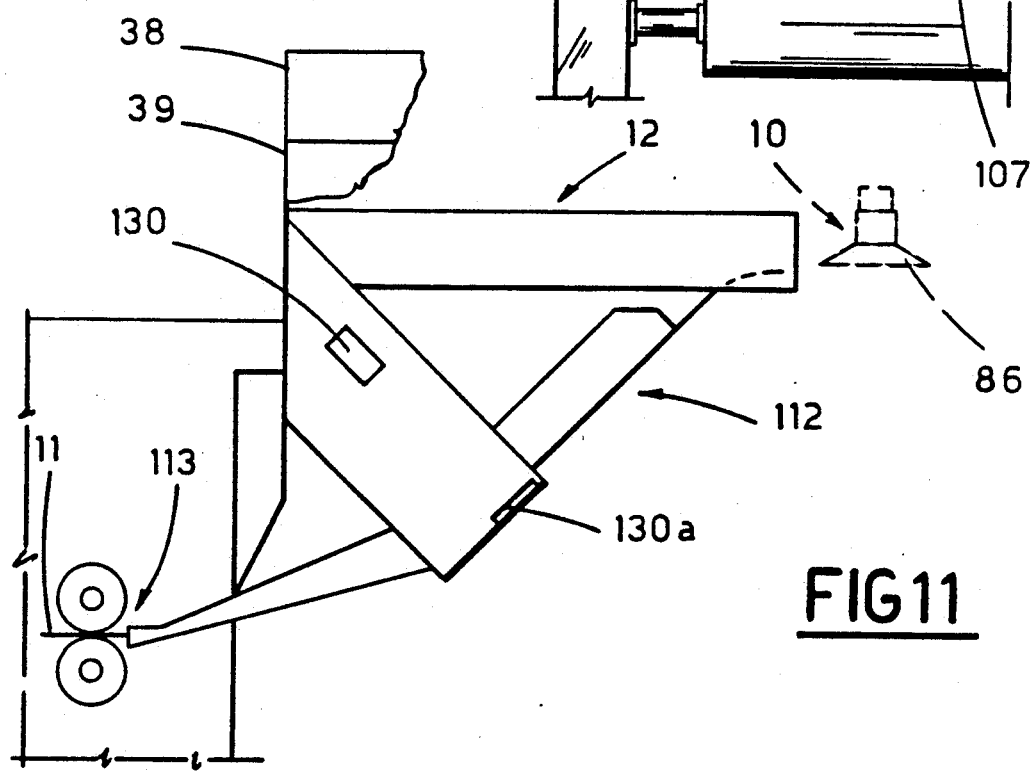

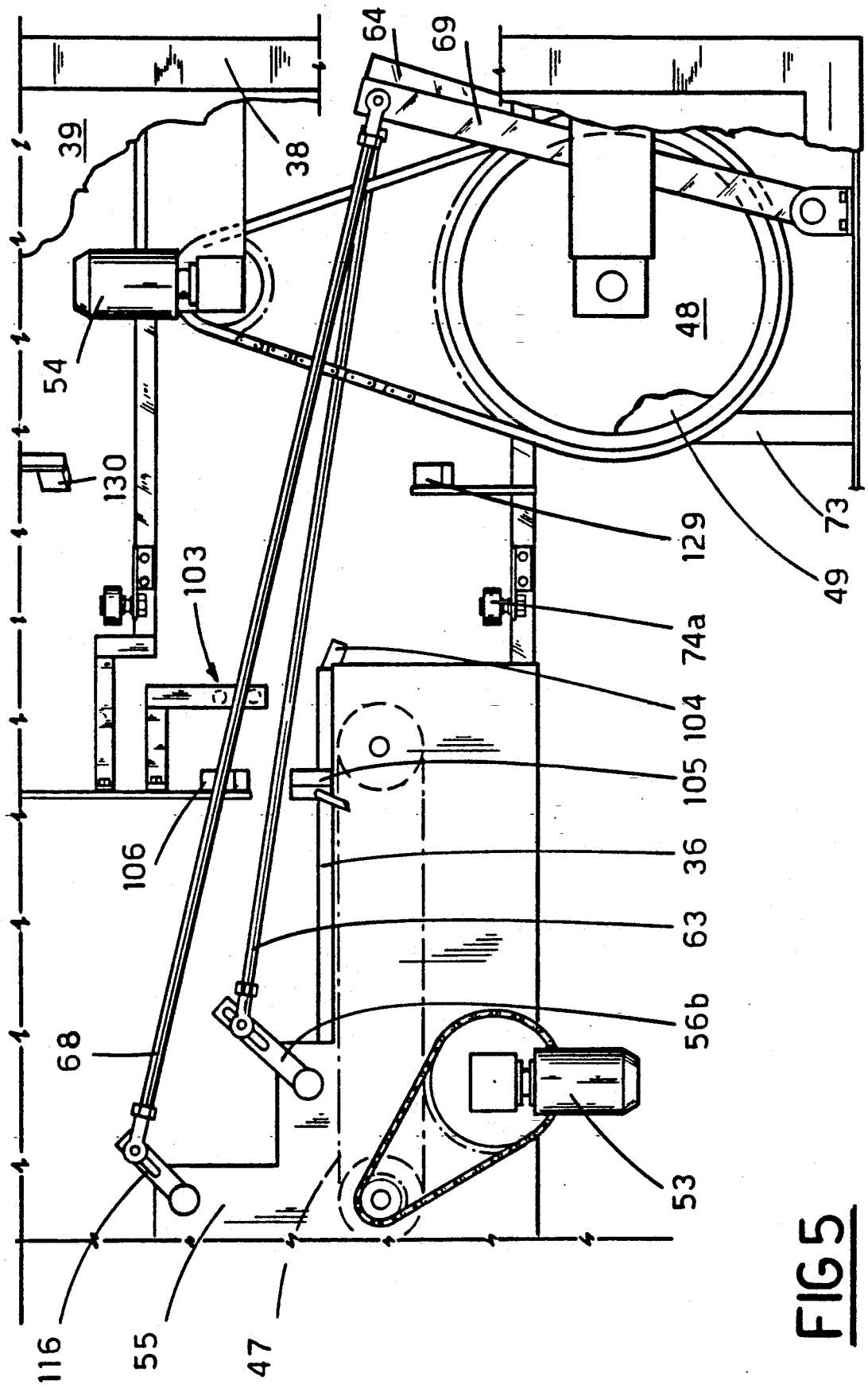

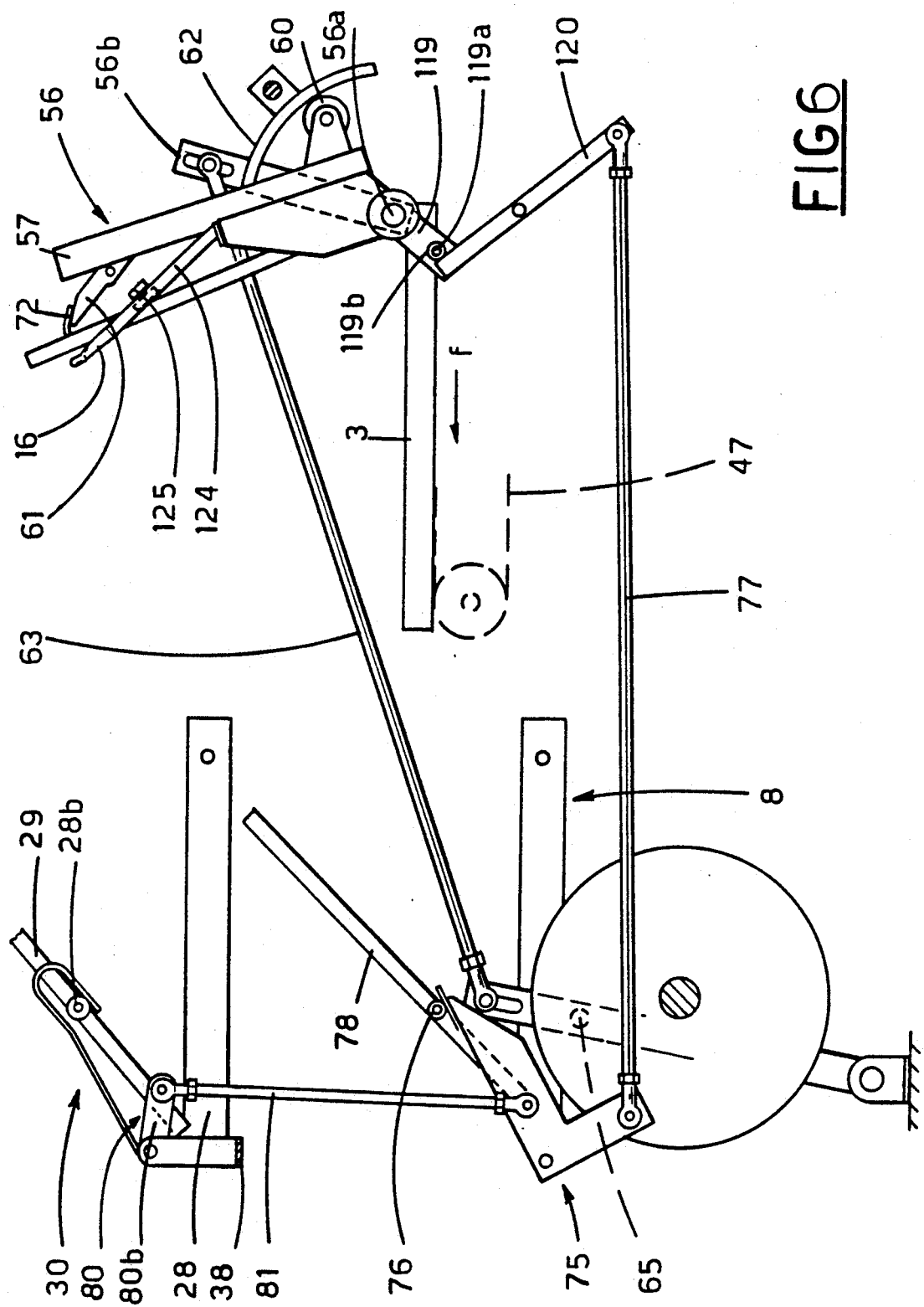

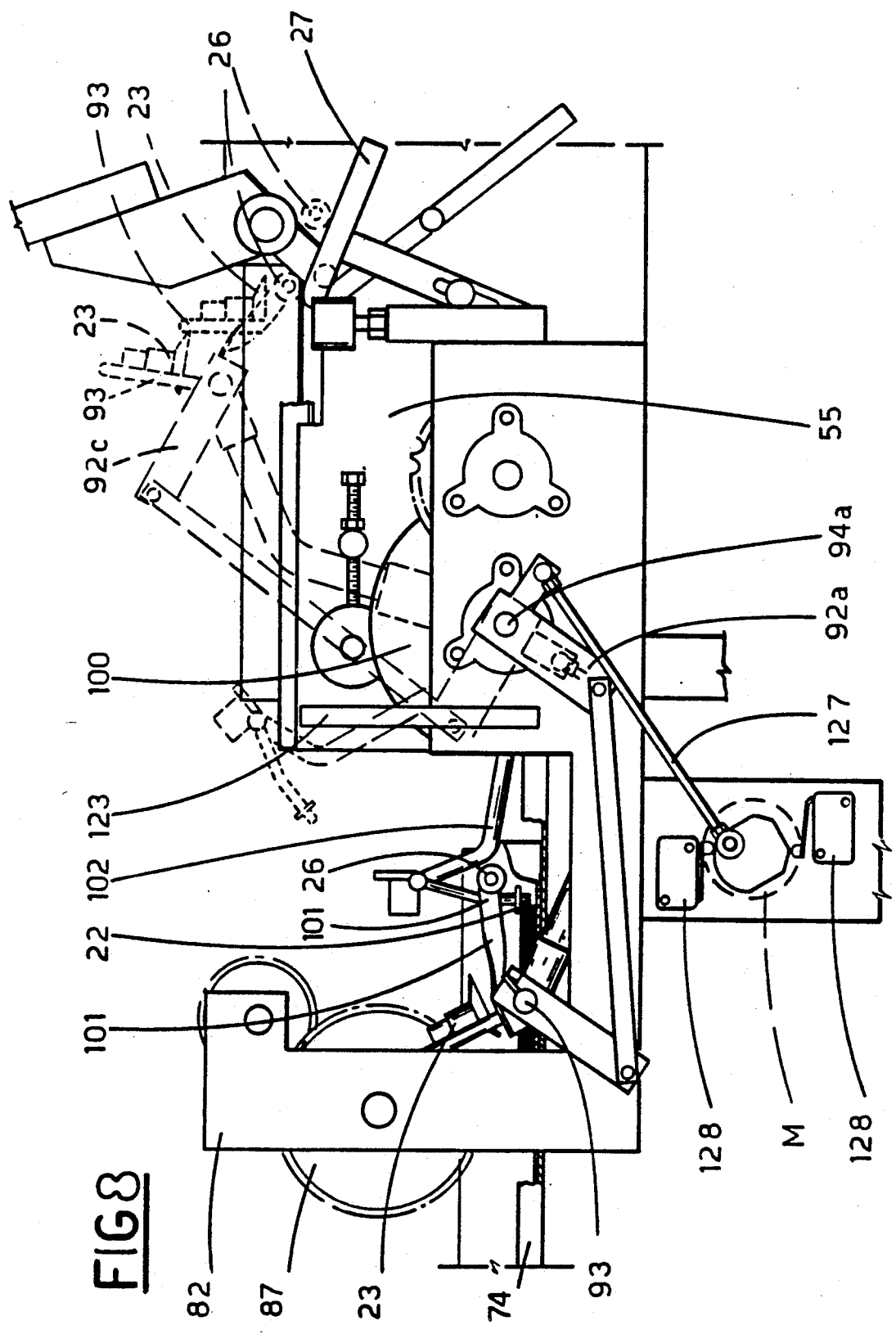

COMPACT AUTOMATIC MACHINE FOR EMPTYING AND RELOADING FILM FROM AND INTO X-RAY CASSETTES

BACKGROUND OF THE INVENTION

The invention relates to an automatic machine of compact dimensions for emptying and reloading film from and into X-ray cassettes.

The prior art embraces a variety of automatic units serving to empty X-ray cassettes of exposed film and reload them with new.

Such units consist substantially in a first station for admission and ejection of the cassette, and a second station, shielded from the light, at which the exposed film is emptied from the cassette and a new sheet of film inserted.

Units of the type in question are provided with a number of magazines, in most cases located above the second station, each one of which contains a given quantity of new film in the various sizes conventionally adopted.

The unit will also incorporate means by which to identify the size of each cassette slotted into the first station, or in effect, given that each size of cassette carries a corresponding size of film, means by which to identify the size of the exposed film that is to be replaced.

Thus, it remains for the operator simply to slot an exposed cassette into the machine, and then extract it reloaded with a new film of the same size. The unit thus generally described will be connected to a developer, in such a way that the exposed film emptied from each cassette can be transferred and processed without further intervention on the part of the operator.

It will be clear enough that equipment of the type in question is complex, bulky and costly, and in practice, suitable only for permanent installation in large hospitals or institutions, where the quantity of X-rays effected is such as to justify commissioning.

Another negative factor with these machines is that the conventional link-up with a developer increases the overall bulk of the equipment still further; accordingly, with the incorporation of numerous, delicate components which detect the size of the exposed film and monitor the machine as a whole for correct operation, it is practically impossible for such equipment to be rendered mobile. By contrast, a genuine requirement exists for the installation of this kind of equipment in mobile services, or at local health centers (where space generally will be at a premium), to the end of providing a complete, immediate X-ray facility and avoiding the despatch of cassettes to a large laboratory for developing. Such would be the ideal situation, for example, in the case of gynaecology clinics, where specialists almost invariably have to send their patients to large hospitals for breast X rays due to the lack of room on their own premises for the installation of equipment to empty and reload cassettes. Similarly, benefits could be derived at tourist and holiday resorts, where the permanent installation of a cassette-loading facility is totally ruled out by seasonal considerations.

Accordingly, the object of the present invention is to provide an automatic machine for emptying X-ray cassettes of exposed film and reloading them with new film of the same size, which will be capable of operating both with and independently of developing equipment, and embodied with dimensions such as to permit of installation, permanently or otherwise, in smaller health centers such as private sector medical clinics.

A further object of the invention is to provide an automatic machine of compact dimensions and solid construction, suitable for use in mobile health services.

Another object of the invention is to provide an automatic machine of compact dimensions that will empty and reload different sizes of film.

SUMMARY OF THE INVENTION

The stated objects are realized by adoption of an automatic machine as disclosed, which serves to empty X-ray cassettes of exposed film and reload them with new film of the same size, and comprises:
- a first station, by which the X-ray cassettes are admitted and ejected singly in succession;
- a second station, incorporating two first devices, serving respectively to open and shut each single cassette and to open and shut a magazine from which new film is dispensed, and operated simultaneously through direct mechanical linkages with two further devices by which the exposed film is picked up from the cassette and transferred to a collection point, and the new film picked up from the magazine and transferred to the empty cassette, respectively. The machine may further comprise a second direct mechanical linkage, interconnecting an adjustable stop engaged by the magazine and a pair of parallel guide fences flanking the cassette, in such a way that the fences can be spread apart proportionally to a movement of the stop occasioned by a larger magazine, and adjust to a larger size of cassette. A first advantage of the machine disclosed, namely its speed of operation, is obtained by virtue of the fact that the various single devices involved in replacement of the exposed film are operated simultaneously.

A further advantage of the machine is that there can be no possibility of either the cassette or the magazine becoming exposed accidentally to the light during admission and ejection, as the opening and closing movements occur simultaneously, with the cassette motionless inside the machine.

Another advantage of the machine is that of a total exclusion of light at the admit-and-reject station, gained by the adoption of a roller faced with soft material and freely adjustable for height; any wear occasioned by movement of the cassette beneath is therefore notably reduced, as the roller can rise unimpeded. Moreover, the roller functions equally well even if defaced, as the soft facing adapts to the transverse profile of the cassette, enclosing and blacking out the space occupied by the cassette just as efficiently as would a brand-new facing. Yet another advantage of the machine disclosed is its versatility; for example, cassettes can also be emptied and ejected without being reloaded, and again, film can be transferred from the magazine to the collection point, using an empty cassette as an intermediate transfer station.

BRIEF DESCRIPTION OF THE DRAWINGS

The invention will now be described in detail, by way of example, with the aid of the accompanying drawings, in which:

FIG. 1 shows an automatic machine according to the present invention, viewed in side elevation from the position of one of the film handling devices with certain parts omitted and/or seen in section better to reveal others, and assuming replacement of one size of film only;

FIG. 2 is a plan of the machine disclosed, seen with certain parts omitted and/or in section better to reveal others;

FIG. 3 shows a side elevation of the station at which cassettes are admitted and ejected, with certain parts omitted better to reveal others;

FIG. 4 shows a detail of FIG. 3, viewed from the standpoint of letter A;

FIGS. 5 and 6 illustrate the device by which the single cassette is opened and closed, together with its surrounding parts, seen in elevation from opposite sides (FIG. 6 corresponding to FIG. 1);

FIGS. 7 and 8 are side elevations of the device by which new film is picked up and transferred, seen in the pick-up and release positions respectively;

FIGS. 11 and 12 show alternative embodiments of the machine disclosed, viewed in side elevation and in plan, respectively;

DESCRIPTION OF THE PREFERRED EMBODIMENT

Figure 7:
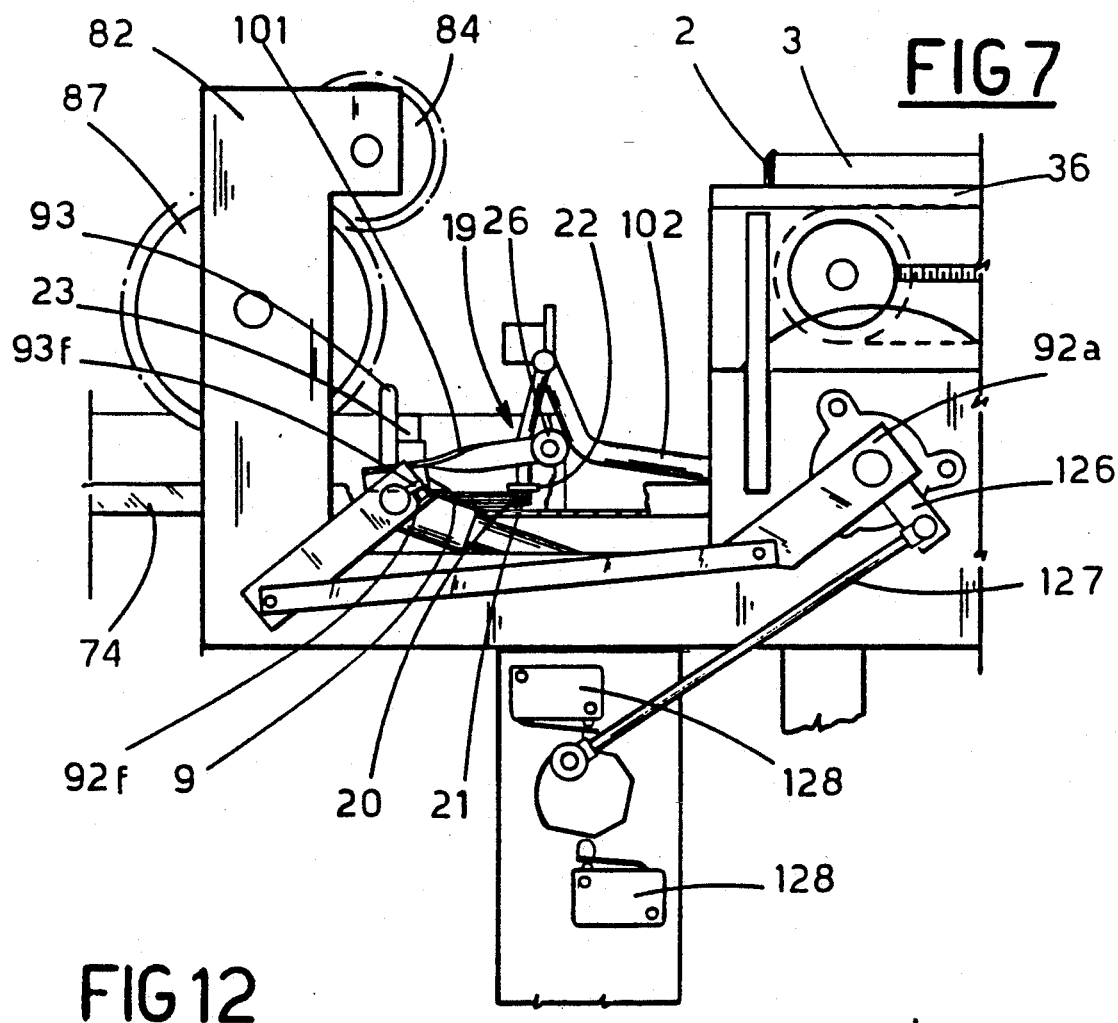

With reference first to FIGS. 1 and 2, an automatic machine according to the invention, denoted 4 in its entirety, appears as a fabricated main frame 38 of parallelepiped shape, in which a light-excluding enclosure is created by the application of outer panels 39 (visible in FIGS. 1 and 3).

The machine 4 comprises a first station 1 (FIG. 1) extending inward from one end of the main frame 38, and a second station 5 aligned longitudinally with the first and totally encompassed by the frame 38. As discernible from FIG. 3, the first station 1 comprises a shelf 15 extending longitudinally into the main frame 38, a freely revolving roller 14, rotatable about a horizontal axis and disposed in tangential contact with the shelf 15 at bottom, and a conveyor belt loop 47 of which the top surface 46 extends forward in alignment with the shelf 15 and operates in combination with a pair of idle tension rollers 107.

The single cassette 3 to be emptied and reloaded is admitted and ejected by way of the shelf 15, and to this end, the shelf 15 constitutes the base both of a casing, denoted 40, and of a transverse slot 44 exhibiting a flat rectangular section marginally greater than the single cassette 3.

The casing 40 is identical in width to the slot 44, and of height such as to accommodate the roller 14 (as will become clear in due course), and will be hinged to the relative panel 39 in order to swing about a vertical axis in the manner of a door.

Both the casing 40 and the outer slot 44 are faced in a soft material, such as carpet pile, designed to combine with the roller 14 in ensuring that no light can penetrate the machine 4, particularly at the moment in which the cassette 3 is admitted or ejected.

The freely revolving roller 14, which will be faced with a layer of particularly soft material 41 such as foam rubber, is mounted to a horizontal shaft 42 that lies parallel with the adjacent panel 39, its opposite ends supported in vertical slots 43 formed in the casing 40 and masked externally by means not shown in the drawings. Accordingly, the roller 14 is freely rotatable about the axis of the shaft 42, and can descend under its own weight to the point of entering into direct contact with the shelf 15, when not suspended at a given height by an obstacle of equivalent height—i.e. by an X-ray cassette 3, proceeding along the shelf 15 inside the slot 44. The facing 41 of the roller 14 will be soft to the point that it wholly engulfs the transverse profile of a cassette 3 occupying the slot 44.

Measured along the axis of the roller 14, the width of the casing 40 and the slot 44 appears marginally greater than that of a single cassette 3, whilst the length of the roller 14 is substantially equal to the width of the casing 40, in such a way that no space remains through which light can penetrate the interior of the machine 4.

The belt loop 47 is totally encompassed by the main frame 38, positioned with its uppermost surface 46 in the same plane as that occupied by the shelf 15 (FIG. 3), and moves in an substantially horizontal direction 'f' parallel to the longitudinal axis of the machine, driven by a relative motor 53 mounted permanently to the main frame 38.

The end of the belt 47 farthest inside the machine is supported by a pair of side plates 55 rigidly attached to the frame 38 and terminating above the level of the conveyor surface 46 in a relative pair of fences 36 by which the cassette 3 is guided on either side.

Figure 13:
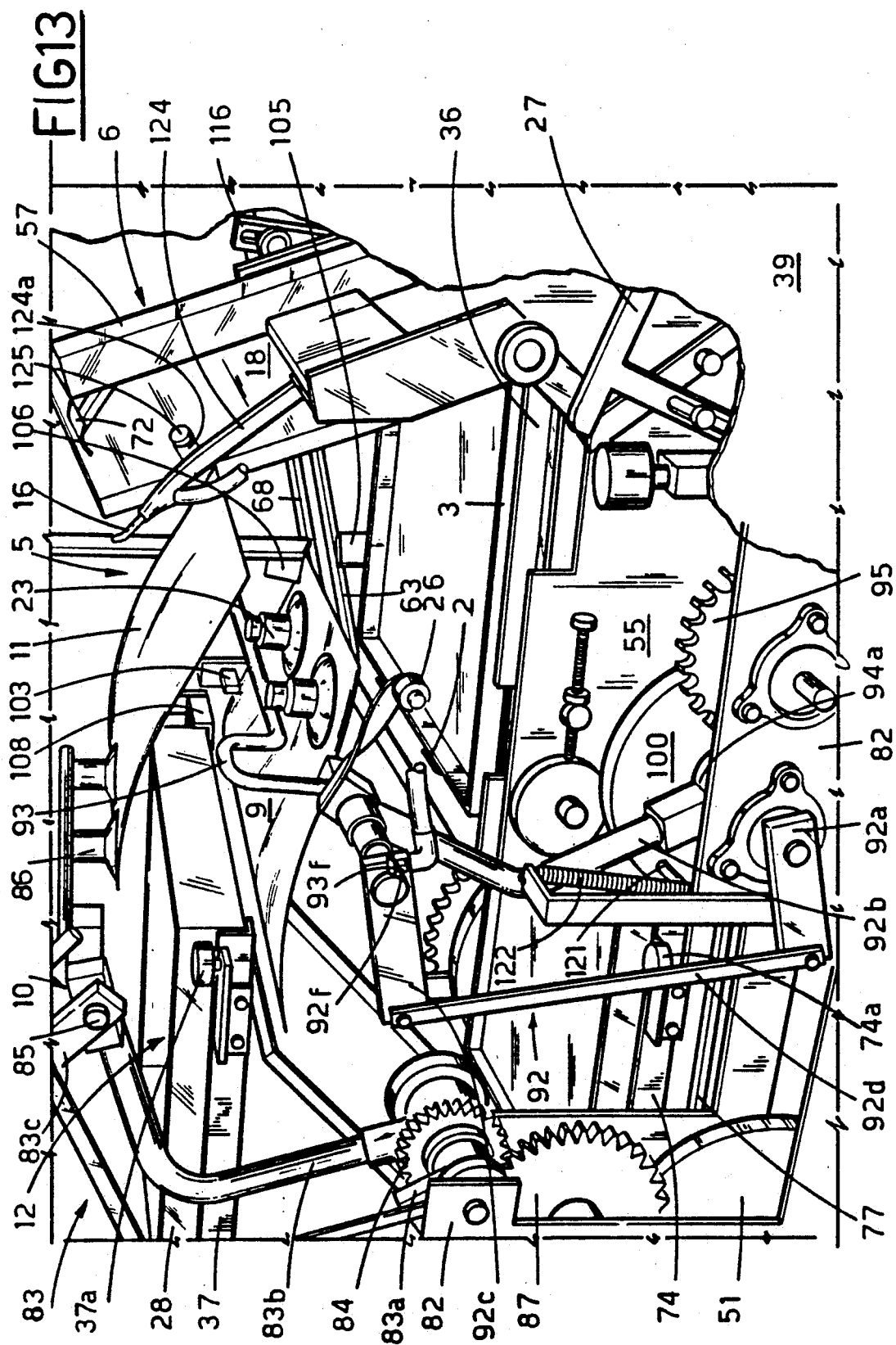
FIG. 13 shows a part of the machine disclosed, seen in perspective from one side.

With reference in particular to FIGS. 2 and 13, this same end of the belt 47 coincides substantially with at least one transverse stop 2, against which the cassette 3 locates when carried forward by the belt 47 in the direction of the arrow f.

The tension rollers 107 are faced in a relatively resilient material, such as rubber, and carried by the bottom ends of respective arms 114, disposed essentially vertical and suspended freely by their top ends from a horizontal shaft 67 lying parallel with the shaft 42 of the foam rubber roller 14 and supported by the main frame 38. Each arm 114 is flanked on either side by a pair of collars 115, rigidly associated with the shaft 67, of which one carries a radial pin 115a that is designed to enter into contact with a horizontal pin 114a extending from the relative arm 114 when the arm rotates in a counterclockwise direction, as viewed in FIG. 3. 114c denotes a spring, anchored at one end to the second collar 115 of the pair and at the remaining end to the arm 114, in such a way that the relative horizontal pin 114a is biased continually into contact with the radial pin 115a offered by the first collar 115. Such an arrangement ensures that the cassette 3 is taken up smoothly when admitted, as the rollers 107 are able to distance flexibly from the belt 47 beneath by rotating upwards in the direction of the arrow f1 (FIG. 3) against the spring bias; similarly, the cassette 3 is made to shut and eject faultlessly, by virtue of the fact that these selfsame rollers 107 are inhibited from swinging beyond a given point in the direction opposite to the arrow f1 by the interaction of the horizontal and radial pins 114a and 115a.

The second station, denoted 5, departs essentially from the stop 2, and is equipped with a device 6 serving to open and shut each cassette 3 in turn, a device 7 serving to open and shut a magazine 8 from which new sheets of film are dispensed, a device 10 serving to pick up the exposed film 11 from each single cassette 3 and transfer it to a collection point 12, and a device 13 serving to pick up and transfer new sheets of film 9 from the magazine 8 to the cassettes 3.

The collection point 12 may be equipped to receive a tray 28, as illustrated in FIG. 1, in which case there will be a further device 30 serving to open and shut the tray.

According to the invention, the various open/shut devices 6, 7 and 30 and pick-up/transfer devices 10 and 13 are interconnected directly by mechanical linkages.

More exactly, the single devices are set in motion by a plurality of cam-profile grooves 71, 66, 99 and 91 formed in the faces of corresponding cam disks 48, 49, 50 and 51, all of which keyed to a common shaft 52 (see FIG. 2) located at the end of the machine 4 opposite from the first station 1; the shaft 52 is disposed parallel with the shaft 67 carrying the tension rollers 107, supported at each end by the main frame 38 and driven in rotation by a second motor 54, likewise mounted to the frame 38 (see also FIG. 5).

The device 6 that opens and shuts the cassettes 3 is located adjacent to the conveyor surface 46, and in fact directly above it (FIGS. 5 and 6).

Such a device consists substantially in a frame 56 of upturned-U shape, the ends of which are hinged to the side plates 55 about a horizontal axis 56a that lies parallel to the tension roller shaft 67, and, with a cassette 3 inserted and the foremost edge of its lid 18 locating against the stops 2, coaxially aligned with the hinge pins of the lid. The right hand member of the frame 56, as seen from the first station 1, articulates via a link 56a with one end of a rod 63 (see FIGS. 1, 2, 5 and 6), the remaining end of which articulates in turn with the top end of an essentially upright lever 64. This same upright lever 64 is pivotably anchored at bottom to the main frame 38 and carries a freely revolving roller, or follower 65, positioned at intermediate height and slidably engaged in the cam groove 66 of the disk denoted 49. The left hand member of the U-frame 56 exhibits a substantially upright projection 119 (FIG. 6) extending downwards and entering into contact, by way of a horizontal pivot 119a and a loose roller 119b, with one end of a substantially upright lever 120 pivotably mounted at an intermediate point along its length to the main frame 38 and connected by its remaining end to a substantially horizontal rod 77 which occupies a longitudinal position in the machine 4. Finally, the cross member of the U-frame 56 carries a hollow arm 57 (see FIGS. 2 and 6) extending forward in the direction of the stops 2, parallel with the path f followed by the cassette 3 and substantially in alignment with the median axis of the belt 47, and accommodating a spring-loaded rod 58 that is biased in the direction of the first station; 59 denotes the spring, by which the rod is ensheathed, whilst 60 denotes a freely revolving roller mounted in a raised position to the end of the arm 57 nearest the first station 1. The forward projecting end of the spring-loaded rod 58 carries a catch 61, which is underslung and directed toward the stop 2 (see FIG. 6), and the roller 60 rides against a contoured plate 62 rigidly attached to the adjacent shaft 67. 116 denotes a crank arm rigidly associated with one end of the same shaft 67, the projecting end of which articulates with one end of a rod 68, this in turn articulated at its remaining end with the top end of a relative substantially upright lever 69. This same upright lever 69 is pivotably anchored at bottom to the main frame 38, and carries a freely revolving roller, or follower 70, positioned at intermediate height and slidably engaged in the cam groove 71 of the disk denoted 48 (FIGS. 2 and 5). The profiles of the cam grooves 66 and 71 thus far mentioned are such as to produce a given sequence of movements, thus: the first rod 63 moves forward away from the foam rubber roller 14, causing the link 56a to rotate the U-frame 56 downward and bring the catch 61 into horizontal alignment with a handle 72 afforded by the cassette 3 (FIG. 6); now the second rod 68 also moves forward away from the roller 14, whereupon the first rod 63 moves back toward the roller 14 and then forward again, and finally, the second rod 68 moves back toward the roller 14. With forward and backward movement of the second rod 68, the contoured plate 62 shifts toward and away from the U-frame 56, extending and retracting the spring-loaded rod 58 against and together with the action of the spring 59, so that the handle 72 is respectively engaged and released by the catch 61.

124 denotes a further arm, hinged to the U-frame 56 about an axis lying parallel to the aforementioned axis of rotation 56a and disposed parallel to the hollow arm 57, which curves marginally downwards to a projecting end that carries a nozzle 16 connected with a source of compressed air (not illustrated), and affords a lug 124a, directed inward over the adjacent edge of the cassette 3 and accommodating a vertical setscrew 125.

The arm 124 occupies a position substantially on the longitudinal left flank of the machine, so as to lie adjacent to the corresponding flank of the cassette with the nozzle 16 substantially alongside the bottom edge of the lid 18, and the setscrew 125 positioned such that its bottom end will enter into contact with the open lid 18 of the cassette.

Thus, the setscrew 125 provides an adjustable depth stop by means of which to set the position of the arm 124 in relation to the lid 18, and ensure that the nozzle 16 is suspended correctly in relation to the edge of the lid 18, notwithstanding variations in depth from cassette to cassette.

The arm 124 itself will hinge with the U-frame 56 across the top edge of its anchored end, in such a way that this same end affords a purchase by means of which to lift the arm if the U-frame is raised with no cassette 3 occupying the station 2.

73 denotes a fixed platform located below the level of and parallel with the conveyor surface 46, and serving to support the magazine 8 from which new film 9 is dispensed. The platform 73 incorporates transverse stops 35 and side fences 74 (see FIGS. 1 and 2), and freely revolving wheels 74a associated with the fences 74 at points near to the belt 47, which rotate about vertical axes. The transverse stops 35 are positioned at the end nearest the cam drive shaft 52, and combine with the fences 74 to create a bay for receipt of the magazine 8.

A magazine 8 of the type in question conventionally incorporates catches by which its lid is secured; accordingly, the distance separating the wheels 74a will be such that when inserted beneath the belt 47 and between the fences 74, the magazine can be slid forward to the point where the catches are engaged and released by the wheels 74a.

The device 7 that opens and shuts the magazine 8 comprises a bell-crank lever 75, pivoted to the fixed platform 73 at the junction of its two right angle members (FIGS. 2 and 6). The top member of the lever 75 extends toward the belt 47 and locates against the underside of a pin 76 issuing sideways from the lid 78 of the magazine 8, whereas the remaining member extends downward and articulates at bottom with the remaining end of the horizontal rod 77 attached to the bottom of the lever 120 aforementioned (FIG. 6). The pin 76 associated with the lid 78 of the magazine 8 lies parallel with and positioned at a given distance from the hinge pins 8b by which the lid 78 and the container 8a of the magazine 8 are connected.

The collection point 12 for exposed film is located above the magazine platform 73, at a level higher than that of the belt 47, and consists similarly in a fixed platform 79, equipped with side fences 37 and transverse stops 108 that combine to create a bay for receipt of the collection tray 28. The ends of the fences 37 nearest the stops 108 are flanked by freely revolving wheels 37a mounted to the fixed platform 79, which perform the same function in the case of the collection tray 28 as do the wheels 74a aforementioned in the case of the magazine, namely, that of releasing the relative lid 29 to enable its being opened.

The device 30 that opens and shuts the collection tray 30 consists in a composite lever 80 pivoted to the main frame 38, and a rod 81, of which one end is hinged to one arm 80b of the composite lever 80 and the other to the top member of the bell-crank lever 75. The remaining arm 80a of the lever 80 is disposed substantially horizontal when at rest, and bent double at the projecting end in such a way as to fold loosely around a pin 28b that projects from the lid 29 of the tray 28 in a sideways direction, parallel with and at a given distance from the hinge pins 28a by which the collection tray 28 and its lid 29 are connected.

The device 10 by which exposed film is picked up from the cassette 3 and transferred to the tray 28 is carried by the horizontal top member of a flat C-shaped bracket 82 attached rigidly to the main frame 38 alongside the magazine 8, and consists essentially in a pair of suckers 86 mounted to a parallelogram linkage 83 of which two long members are dog-legged; of the two shorter members, one is fixed 83a and anchored rigidly to the bracket 82. One longer member 83b extends upward to connect with the remaining shorter member, denoted 83c, and is anchored rigidly at bottom to a gear 84. The top end of the longer member 83b in question rotatably accommodates a shaft 85 rigidly associated with the moving shorter member 83c and disposed transversely across the main frame 38; it is this shaft that carries the suckers 86. The suckers 86 are directed downwards, and will be connected with a source of negative pressure (not illustrated) by any suitable means, e.g. via the shaft 85 itself, which could be embodied hollow for the purpose. The length and positioning of the member denoted 83b will be such, that when effecting a pick-up, the suckers 86 enter into contact with the edge of the exposed film 11 nearest to the stop 2, that is, the leading edge, considered in the direction of the arrow f, so as to ensure that the film will not bend and droop under its own weight, risking contact with parts of the machine that might damage it.

The gear 84 aforementioned is in constant mesh with a second gear 87 mounted idle to the upright member of the C-shaped bracket 82 and articulated at a given point offset from center with one end of a substantially horizontal rod 88, the remaining end of which articulates in turn with the top end of an essentially upright lever 89 pivotably anchored at bottom to the main frame 38 and carrying a freely revolving roller, or follower 90, positioned at intermediate height and slidably engaged in the cam groove 91 of the disk denoted 51 (FIGS. 1 and 2). In like manner to the device 10 described above, the device 13 by which new film is picked up and transferred to the cassette 3 incorporates a pair of suckers 23 carried by a quadrilateral linkage 92 comprising two longer members 92b and 92d that are of equal distance between centers, alternated with two shorter members 92a and 92c of unequal distance between centers. The bottom shorter member 92a, of which the distance between centers can be adjusted (whilst remaining the shortest of the linkage 92), is anchored pivotably to a bottom horizontal member of the C-shaped bracket 82 by the end nearest the first station 1; this same end articulates with the longer member denoted 92b, which extends upward to terminate in a top end that rotatably accommodates a shaft 93 carrying the suckers 23 (here too, the source of negative pressure is not illustrated). The sucker shaft 93 is disposed transversely to the longitudinal axis of the main frame 38 and coupled pivotably, tensioned by a spring 92e, to the end of the top shorter member 92c of the quadrilateral 92 directed toward the first station 1; this same end of the shaft 93 also supports a short arm 101, set at right angles and projecting downward toward the belt 47, the projecting end of which carries a follower 26 destined to enter into contact with a fixed cam profile 27 when the quadrilateral 92 is in motion. The spring 92e serves to maintain the shaft 93 and the relative short member 92c of the linkage 92 in a given configuration whereby the suckers 23 are disposed with axes substantially vertical when in the magazine 8; to this end, the two components exhibit a radial pin 93f and a fixed projection 92f, respectively, by way of which the necessary contact occurs, positioned in such a way that the shaft 93 and the suckers 23 can rotate counterclockwise (as seen in FIG. 1) in relation to the member 92c, against the bias of the spring 92e. The difference in the distance between centers of the two shorter members 92a and 92c of the linkage is such that the axes of the suckers 23 remain vertical when the longer members 92b and 92d are rotated all the way to the left (FIG. 7), and rotate marginally clockwise when the same members 92b and 92d are swung to the right (FIG. 8). In like manner to the equivalent member 83b of the parallelogram linkage 83, the length and position of the member denoted 92b will be such that the suckers 23 pick up the sheet 9 of new film from the edge nearest the stop 2, i.e. the leading edge, considered in relation to the direction of transfer. The bottom shorter member 92a is also provided with a lug 126 (FIGS. 1, 7 and 8) projecting downwards from the end anchored to the bracket 82 and articulated with one end of a rod 127; the remaining end of this same rod 127 articulates eccentrically with the shaft of a motor M, interlocked to sensing means 128 in such a way as to complete one full revolution with each cycle triggered, and cause the bottom member 92a of the quadrilateral 92 to pivot counterclockwise and clockwise in alternation, as will be described in due course.

The purpose of the fixed cam 27 (FIG. 1), engaged by the follower 26 of the short arm 101 as the longer members 92d and 92d of the quadrilateral 92 swing toward the first station 1, is to rotate the sucker shaft 93 counterclockwise against its spring 92e, at least into a position such that the pads of the suckers 23 are disposed parallel with the bottom of the cassette 3.

Figure 9:
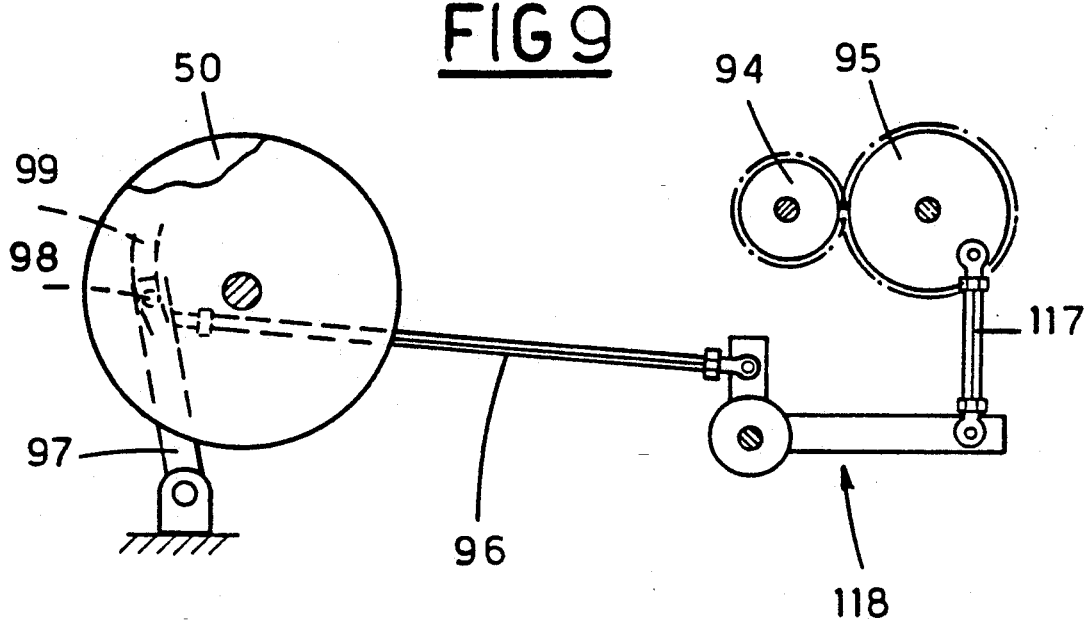
FIG. 9 illustrates the moving parts of the device of FIGS. 7 and 8, seen in an elevation corresponding to that of FIG. 1.
Figure 10:
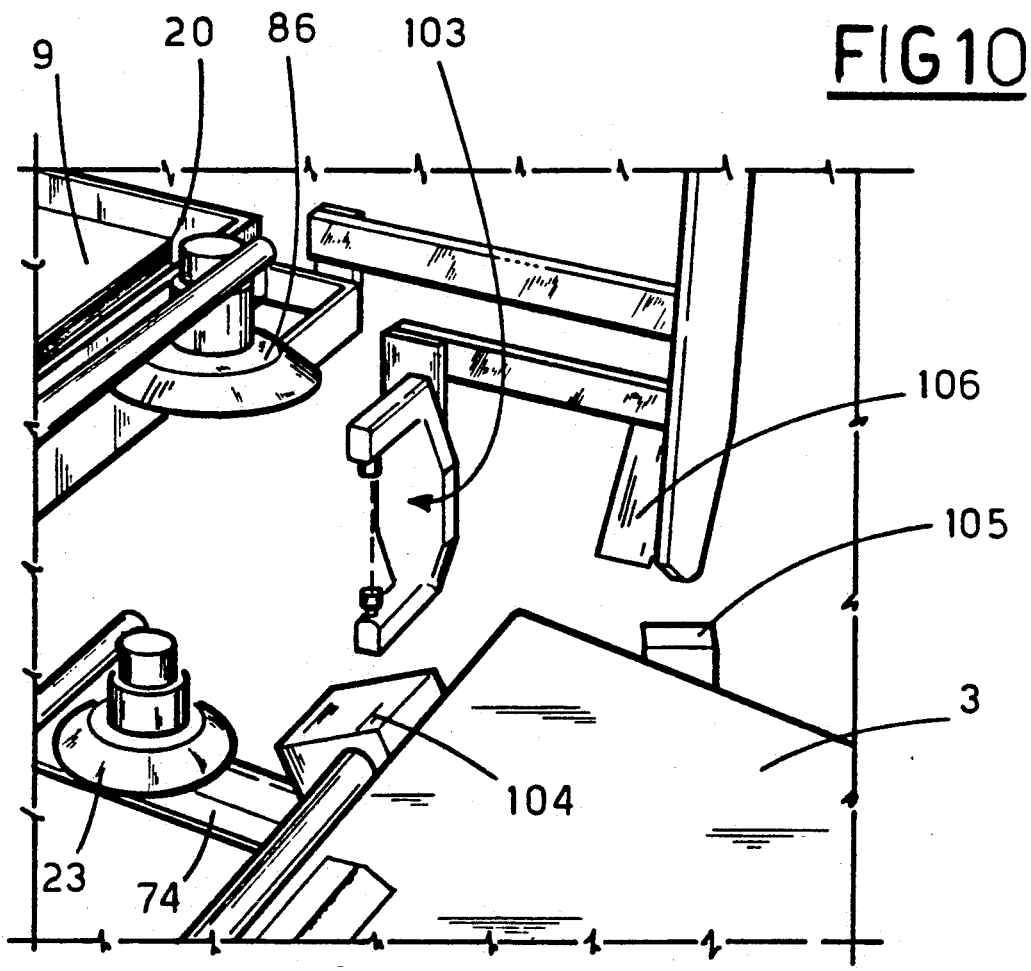
FIG. 10 is a perspective of sensing means forming part of the machine disclosed.

Besides articulating with the shorter member 92a, the bottom end of the long member 92b is rigidly associated with a first gear 94 mounted freely to a fixed shaft 94a carried by the bracket 82 and in constant mesh with a second gear 95, also supported rotatably by the bracket 82. The second gear 95 in turn carries one end of a vertical rod 117, pivoted at a point offset from its axis of rotation, of which the remaining end is connected pivotably to the horizontal arm of an L-shaped rocker 118 freely pivoted to the main frame 38. The top end of the vertical member of the rocker 118 is interconnected with a substantially upright lever 97 by way of a rod 96; the upright lever 97 articulates with the end of the rod 96 at an intermediate point along its own length, and is pivotably anchored at bottom to the main frame 38, its top end carrying a freely revolving roller, or follower 90, slidably engaged in the cam groove 99 of the disk denoted 50 (FIGS. 2 and 9).

The fixed shaft 94a also carries a freely rotatable disk 100, which in turn affords an eccentrically located pin 121 issuing from one side face beneath and in vertical alignment with the relative long member 92b of the quadrilateral 92; the pin 121 in question serves to anchor one end of a spring 122, of which the remaining end is anchored above the level of the disk 100 to a fixed bracket 123. 102 denotes a rigid pipe associated with the side of the disk 100 opposite that carrying the pin 121, which is bent into a transverse position across the longitudinal axis of the machine 4 and carries a plurality of downwardly directed nozzles 19 with radially-oriented orifices 21, as shown in FIG. 7; each such nozzle 19 is provided with a flange 22 positioned immediately above the orifices 21 and designed to locate against the leading edge 20 of the stack of sheets 9 contained by the magazine 8. The machine 4 also comprises a monitoring circuit serving to verify correct operation, comprising photoelectric sensors: a first set of sensors 103, 104, 105, and 106 distributed around the leading edge of the cassette 3 on the side of the open/shut rods 63 and 68, and further sensors 129 and 130 positioned near the magazine 8 and the collection tray 28, respectively. The first such sensor 103 emits a beam of light through the trajectory of the sheet 9 of new film picked up from the magazine 8, in order to verify its transparency; the second 104 throws a beam in the direction of a reflecting surface afforded by or incorporated into the inside face of the lid 18 of the cassette 3; the third 105 throws a beam across the trajectory of the lid 18 when opening; the beam of the fourth 106 is trained on a reflecting surface afforded by or incorporated into the bottom of the cassette 3, with the lid 18 open, and on a reflecting surface afforded by or incorporated into the lid 18 itself, when shut. Clearly enough, the surfaces reflecting the beam from the fourth cell 106 will be aligned along a common trajectory. The fifth sensor 129 throws a beam toward the inside of the magazine 8 so as to verify the number of sheets 9 in reserve, and the beam from the sixth sensor 130 is directed at a reflecting surface afforded by or incorporated into the collection tray 28.

The machine will also incorporate monitoring and control means, not illustrated, to which the six photoelectric sensors (and others not shown in the drawings) are all interlocked, together with the components governing operation of the motor M and rod 127 and the compressed air and vacuum circuits, their operation being appropriately synchronized with the rotation of the cam drive shaft 52. Operation of the machine will now be described, with reference to FIGS. 1 ... 13, remembering that the illustrations reflect just one example of its many possible embodiments; the standpoint adopted in describing movements "left", "right", "clockwise" and "counterclockwise", is that of FIG. 1.

The operating cycle departs from a general at-rest configuration, reflecting the condition of the machine following initial installation. In such a condition, the hollow arm 57 of the device 6 that opens and shuts the cassette 3 is raised slightly from the conveyor surface 46 of the belt 47 (FIG. 1) with the catch 61 retracted, held back by the action of the spring 59. The arm 124 carrying the compressed air nozzle 16 is also raised marginally, in such a way that a cassette 3 can pass freely beneath. The position of the projection 119, which is noticeably displaced to the right, allows the adjacent mid-pivoted lever 120 to rotate clockwise, riding against the roller 119b associated with the projection 119; accordingly, the levers 75 and 80 of the devices 7 and 30 that open and shut the magazine 8 and the collection tray 28 will be in an at-rest position, rotated fully clockwise with the members that engage the respective pins 76 and 28b, substantially horizontal. The shafts 85 and 93 carrying the suckers 86 and 23 of the devices 10 and 13 by which exposed and new sheets of film 11 and 9 are picked up and transferred are positioned at given points between the two sets of transverse stops 2 and 35 and outside the three trajectories described respectively by the lids 18, 78 and 29 of the cassette 3, the magazine 8 and the collection tray 28. Finally, the pipe 102 carrying the air nozzles 19 will be positioned with its horizontal stretch lifted above the trajectory of the magazine lid 78, by the combined action of the spring 122 and the disk 100.

To set the machine in operation, a magazine 8 full of new sheets 9 of film must now be placed on the platform 73 between the fences 74 and against the stops 35, with the pin 76 of its lid 78 located above the horizontal lever 75 of the corresponding open/shut device 7, and an empty collection tray 28 positioned on the upper platform 79 between and against the relative fences 37 and stops 108, with the pin 28b of its lid 29 embraced by the relative arm 80a of the composite lever 80 afforded by the open/shut device denoted 30. To prolong the period of time the machine is able to operate without being opened up, a double capacity magazine 8 will be adopted, i.e. two magazines, inserted from the right hand end (FIG. 1) and slid beneath the belt loop 47, with open ends directed one toward the other. Operation remains the same with the single magazine 8, however, and without prejudice to the scope of the invention, and in this instance the magazine might be inserted from the left hand end. In order to insert a magazine 8, the casing 40 must first be swung to one side (FIG. 3) so as to gain access to the side fences 74.

At this point, the machine is ready to replace the exposed sheet of film 11 in a cassette 3 with a new sheet 9 of the same size. The cassette 3 containing the exposed film 11 is inserted through the slot 44 with the lid hinges hindmost and the reflecting surface uppermost. Insertion of the cassette 3 as in FIG. 3 will trigger operation (by way of means not illustrated) of the motor 53 that drives the belt 47, and cause the foam rubber roller 14 to deform progressively, thereafter obliging it to rotate, and then to lift, in the event that the height of the cassette is greater than the facing's capacity for radial compression. Beyond the soft foam roller 14 and on the belt 47, the cassette 3 passes beneath the tension rollers 107 and is thus held firmly while proceeding along the conveyor surface 46 beneath the relative open/shut device 6 and into contact with the stop 2. Meanwhile, the foam roller 14 will have regained its former shape and position, totally blacking out the slot 44 so that no light can penetrate to the interior of the machine 4.

The correct position of the cassette 3, in contact with the stop 2 and facing in the right direction, is verified by the relative sensors 106, which duly switch off the conveyor motor 53, thus preventing unnecessary wear that would result if the belt 47 were to continue turning with the cassette 3 fast against the stop 2; at the same time, the cam drive motor 54 is switched on and the shaft 52, hence the disks 48, 49, 50 and 51, set in motion. First, the hollow arm 57 is lowered by the relative disk 49, groove 66 and rod 63, whereupon, with the nozzle arm 124 lowered to the point where the setscrew 125 locates against the cassette lid 18, the contoured plate 62 is rotated against the roller 60 by the relative disk 48, groove 77 and rod 68, shifting the spring-loaded rod 58 against the action of the spring 59 and causing the catch 61 to locate under the handle 72 and release the lid 18 (FIG. 6). The pulling motion of the first rod 63 now inverts, and the lid 18 is pushed up to a fully open position (FIG. 13) in readiness to admit the suckers 86; as the U-frame 56 rises, the roller 60 will ride along the plate 62 in such a way that the catch 61 and the handle 72 remain engaged.

With the U frame 56 rotating upwards, the lever 120 below will rotate counterclockwise, thereby moving the relative rod 77 in the direction of the first station 1; accordingly, the bell-crank lever 75 is rotated counterclockwise, engaging the relative pin 76 and opening the lid 78 of the magazine 8, and at the same time, pushing up on the rod 81 connected to the composite lever 80 so as to lift the lid 29 of the collection tray 28, likewise by way of the relative pin 28b. Meanwhile, the devices 10 and 13 by which exposed and new sheets of film 11 and 9 are picked up and transferred will have been set in motion by the relative sets of disks 51 and 50, levers 89 and 97 and rods 88 and 96, in such a way that the sucker shafts 85 and 93 move toward and ultimately into the cassette 3 and the magazine 8, respectively, the one set of suckers 86 descending onto the exposed sheet 11 of film, and the other set of suckers 23 onto a new sheet 9. Accordingly, immediate access is afforded to the interior of the cassette 3 and of the magazine 8 by virtue of the fact that the lids 18 and 78 are already rising as the suckers 86 and 23 are set in motion. The force with which the loading suckers 23 bear down on the new film is maintained constant, regardless of the number of sheets 9 occupying the magazine 8, by way of conventional take-up springs (not illustrated). With the lids 18 and 78 thus open as described, the bottom member 92a of the quadrilateral linkage 92 shifts downward, whereupon the articulated longer member 92b enagages the adjacent pin 121, rotating the associated disk 100 against the action of the spring 122 such that the pipe 102 (attached rigidly to the disk 100) rotates left until the nozzles 19 enter the magazine 8 and locate against the leading edge 20 of the stack of new sheets 9 (see FIGS. 7 and 8); at this point, the nozzles 19 rest firmly in contact with the leading edge 20 of the stacked sheets 9, vertically aligned by way of the relative flanges 22.

The suckers 86 and 23 duly having registered with the respective exposed and new sheets of film 11 and 9, compressed air is discharged radially from the orifices 21 of the nozzles 19, in such a way as to separate the new sheets 9 of film one from the next, and a suitable degree of vacuum is generated through the suckers. With the suckers operating, and the pipe 102 and the long member 92b of the linkage 92 still stationary, the motor denoted M is switched in, actuating the rod 127 (FIGS. 7 and 8) to rotate the bottom member 92a counterclockwise and clockwise, in succession; this has the effect of rocking the entire linkage 92, hence the attached suckers 23, which in rising, lift the leading edge of the top sheet 9 above the level of the nozzle flanges 22 and begin rotating upwards and clockwise toward the cassette 3. Thus, the stack of sheets 9 is subjected to two distinct actions in order to ensure separation of the topmost sheet: the first pneumatic, produced by the nozzle orifices 21, and the second mechanical, produced by interaction of the suckers 23 and the nozzle flanges 22. Substantially at the moment in which the one set of suckers 23 is moved toward the cassette 3 by the relative cam groove 91, the other suckers 86 will be moved by the corresponding groove 99 toward the collection tray 28 to deposit the exposed film 11 picked up from the bottom of the open cassette 3. As the long member 92b of the reload linkage 92 rotates clockwise toward the cassette 3, the air pipe 102 is returned upward to its at-rest position by the spring 122 anchored to the pin 121 of the relative disk 100; the flow of air will be cut off the moment that the long member 92b begins moving to the right. Thus, the two sets of suckers 23 and 86 describe their respective trajectories, crossing over in mid-path and ultimately gaining the inside of the cassette 3 and the collection tray 28. Owing to the dissimilar distance between centers of the short members 92a and 92c of the quadrilateral 92, the reload suckers 23 will be rotated marginally clockwise on their descent into the cassette 3, and accordingly, the arm 101 associated with the end of the relative shaft 93 now enters into contact with the fixed cam profile 27, by way of the follower 26 (FIG. 8), forcing the suckers 23 counterclockwise at least to the point where their suction pads are horizontally disposed. This same dipping movement of the suckers 23 ensures that the new film 9 is deposited safely on the bottom of the cassette 3, irrespective of the depth of the cassette itself, given that the leading edge of the sheet is angled downwards on entry. By contrast, were the cam 27 and follower 26 assembly to be omitted, and the quadrilateral 92 embodied as a parallelogram, the sheet 9 of new film would be transferred from the magazine 8 parallel with itself and with the bottom of the cassette 3, and the risk would exist of its becoming wedged between the lid 18 and the rear of the cassette, and damaged subsequently when the lid is shut.

The moment that the sheets of film 9 and 11 are placed on the bottom of the cassette 3 and the collection tray 28, respectively, suction ceases through the two sets of suckers 23 and 86, and the quadrilateral and parallelogram linkages 92 and 83 rotate back toward the at-rest position of FIG. 1. At a given point during this return movement, the open/shut devices 6, 7 and 30 of the cassette 3, the magazine 8 and the collection tray 28 are again set in motion. In the case of the cassette 3, the U-frame 56 is rotated counterclockwise to lower the hollow arm 57, and with it, the lid 18; with just a part of the downward trajectory completed, the contoured plate 62 will rotate clockwise to release the catch 61, which is retracted by the spring 59, thus allowing the lid 18 to drop toward the shut position. With continued counterclockwise descent of the U-frame 56, hence of the projection 119, the associated lever 120 is allowed to rotate clockwise under the weight of the remaining lids 78 and 29, transmitted through the respective levers 75 and 80 and interconnecting rods 81 and 77, and assisted by a relative spring (not illustrated); at this point, accordingly, the cassette 3, the magazine 8 and the collection tray 28 are all shut. The entire film reload cycle is effected in one full revolution of the cam drive shaft 52, on completion of which, the relative motor 54 will shut off, and the conveyor motor 53 starts up again, rotating in the direction opposite to that which brought in the cassette 3 containing the exposed film 11. The belt 47 is thus set in motion, moving in the direction opposite to that of the arrow f in FIG. 3, and the cassette 3, firmly shut and reloaded with a new sheet of film 9 of the same size as the exposure 11 just emptied, is ejected by way of the slot 44. In ejecting, the cassette 3 passes between the belt 47 and the two tension rollers 107, which press down on the lid 18 and ensure that it is properly shut. More exactly, the expedient of the pins 114a and 115a and the bias springs 114c ensures that the roller arms 114 are free to rotate counterclockwise (as viewed in FIG. 1, it will be recalled) against the spring bias, on passage of the cassette 3 beneath in the direction of the arrow f, whereas with the cassette moving in the direction opposite to that of the arrow, a limited rotation only is allowed, namely, to the point where the horizontal pin 114a locates against the radial pin 115a.

The description thus far assumes that no signal has been relayed from any of the sensors 103, 104, 105, 106, 129 or 130 to the monitoring and control means indicating irregular operation.

Initial verifications are effected by the sensors denoted 129 and 130, which inhibit operation of the machine altogether and provide indication of error, in the event either that the supply of new film 9 in the magazine 8 has run out, or/and that the collection tray 28 is already full. In situations such as these, the machine will restart only after the empty magazine 8 has been replaced with a full magazine and/or the full tray 28 with an empty tray, and the monitoring and control means reset. Should the cassette 3 be inserted incorrectly, the sensors 106 directed at the reflecting surface of the lid 18 (which are enabled by introduction of the cassette into the slot), will abort the cycle, and trigger ejection of the cassette 3 accompanied by the relative error indication signal. Should the cassette 3 be inserted correctly, but fail to open, then the lid trajectory sensors 105 will abort the cycle, again triggering ejection together with the appropriate error signal. Should the lid 18 of the cassette open correctly, but its inner reflecting surface fail to return the beam from the relative sensors 104, air will be blown from the adjacent nozzle 16, say three times, and the beam offered a second time; if there is still no reflection at this point, no vacuum will be generated through the suckers 86 and 23, and no pick-up effected. In this situation, the cycle aborts prior to replacement of the film 11, thus avoiding the possibility that two sheets of film find their way into one cassette and enabling the machine to gain an extra cycle, and a 'not-emptied' error signal is triggered. If there is no response from the reflection sensors 106 when re-enabled to check the bottom of the cassette 3, following operation of the suckers 86, signifying that the exposed film 11 has not been picked up, the cycle will again abort in the 'not-emptied' condition. Should the reload suckers 23 happen to pick up more than one sheet 9 of new film, the reduced transparency is detected, and the relative sensors 103 trigger an error signal to indicate more than one film occupying the cassette 3. In the event, finally, that the reflection sensors 106 continue to respond to the bottom of the cassette 3 when re-enabled following operation of the reload suckers 23, a 'not-reloaded' error signal will be triggered.

In addition to verifying the full or empty state of the magazine 8, the sensors denoted 129 will also indicate when the supply of new sheets 9 depletes beyond a given minimum number; the cycle is not inhibited in this instance, though an indication of the low state of the supply will appear throughout operation.

The expedient of interlocking all moving parts to a single cam shaft 52 ensures advantageous operating speed, coupled with the certainty that emptying and reload operations occur faultlessly and independent of one another, and that the lids 18, 78 and 29 will be securely shut at the moment when a cassette is inserted into or ejected from the machine. Variations in embodiment of the machine are shown in FIGS. 11 and 12.

It will be recalled that the emptying and reloading machine can be installed in combination with a unit for developing exposed film, in which case the bay accommodating the collection tray, and the relative open/shut device 30, would be replaced with means by which to support the top end of a chute 112, as illustrated in FIG. 11. The cross section of the chute 112 will encompass the film totally, at least at the runout, or externally of the machine 4 at all events, where the sheet 11 passes to the infeed station of the developer, shown schematically as a pair of pinch rolls 113 in FIG. 11. In this type of arrangement, reflection sensors 130 will be located along the path of the chute 112, together with a corresponding reflecting surface 130a, and more exactly, at a point where the exposed film 11 comes to rest on initially engaging the pinch rolls 113. As long as the beam fails to bounce back from the reflecting surface 130a, signifying that a film 11 is still occupying the chute 112, a 'not ready' signal will be gated that inhibits the admission of further cassettes 3. The option also exists of setting the monitoring and control means in such a way as to inhibit the pick up of new film 9, and thus use the machine 4 as an emptying device only. Similarly, the machine can be used as an automatic loader for a developing unit. For example, having removed a full collection tray 28 from one machine, say, forming part of a mobile service, the exposed material 11 can be transferred (in a dark room) to an empty magazine 8, and reloaded thus into another machine embodied as in FIG. 11, i.e. incorporating a chute 112 and linked up to the developer. An empty cassette 3 is now inserted, and the monitoring and control means are set in such a way that this will continue to occupy the first station 1 at the end of each cycle, ejecting only in the event that an error should occur as described above. Accordingly, with the empty cassette 3 inserted and the cycle set in motion, sheets 11 will be picked up singly from the magazine 8, transferred to the cassette 3, then picked up immediately from the cassette and transferred to the collection point 12, or in this instance, the top and of the chute 112, and thence to the developer. When the magazine's empty state is detected ultimately by the sensors 129, the machine will effect one more cycle to transfer the last film 11 from the cassette to the chute, before finally ejecting the cassette.

The machine disclosed can also be utilized for emptying and reloading more than one size of X-ray film, for example two different sizes. To this end, FIG. 12 shows one possible embodiment of a direct mechanical linkage between the transverse stop 35 of the magazine platform and the fences 36 flanking the cassette 3. The drawing illustrates two sets of transverse stops 32 and 35 and the side fences 74 for the magazine 8, and the transverse stops 2 and side fences 36 serving the cassette 3. The magazine fences 74 are fixed, as magazines 8 of the type in question are conventionally of standard base width, regardless of film size. The stops 32 are fixed at one end, whereas the stop 35 at the remaining end is spring-loaded and adjustable, moving outwards from an at-rest position (bold line, FIG. 12) that corresponds to the length of the smaller size of magazine 8. Transverse stops 2 for the cassette 3 are embodied by bending the ends of the fences 36 in toward one another, and the fences themselves are hinged by their outermost sides to arms 109 of identical length, thereby constituting members of respective articulated parallelograms; these fences are also spring-loaded, and adjustable away from an at-rest position (bold line, FIG. 12) corresponding to the dimensions of the smaller size cassette 3. The transverse stop 35 of the magazine bay connects with the cassette side fences 36 through a system of levers (not illustrated) arranged such that any movement of the stop 35 in the direction of the arrow g will force the fences 36 to move in the same direction. Thus, when the magazine 8 utilized contains new film 9 of the minimum size handled by the machine, neither the stop 35 nor the fences 36 will move, and their positions remain as depicted by the bold line in FIG. 12.

Figure 12:
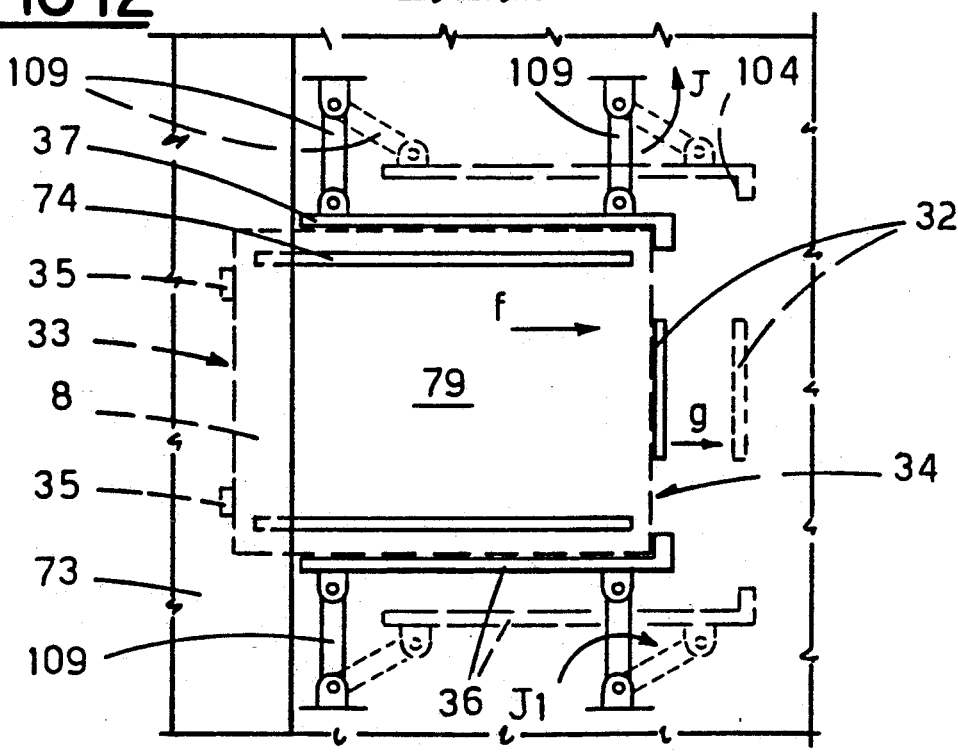

By contrast, where the magazine 8 contains a larger size of film 9, its insertion between the stops 32 and 35 will cause the adjustable stop 35 to move outwards and away from the fixed stops 32, in the direction of the arrow f (FIG. 12). As a result of this same movement, the side fences 36 are drawn in the same direction f, and in addition, spread apart by the action of the arms 109 which constrain them to rotate outwards in the direction of the relative arrows J and J1. Accordingly, it becomes possible for the side fences 36 and stops 2 to accommodate a cassette 3 larger than that of the smallest size normally handled, while ensuring the same coaxial alignment between the hinge pins of the lid 18 and the two pivots 56a to which the U-frame 56 of the relative open/shut device 6 is hinged. Clearly enough, the dimensions of the arms 109 and of the various interconnecting levers will be such that a given movement of the magazine stop 35 produces a correctly proportioned movement of the cassette fences 36 and stops 2.

When replacing the magazine 8, hence when removing it from the machine, the transverse stop 35 and the side fences 36 will be returned automatically to the at-rest position (bold line, FIG. 12), assuming the configuration relative to the smallest size of film as already described.

In the part of the foregoing description relative to FIG. 12, mention is made only of the magazine 8 and the cassette 3, though the same principle will clearly apply in the case of a collection tray 28, and indeed all such components of which faultless operation is tied to the size of the film 9 being handled.

For example, to ensure that the suckers 86 and 23 make contact with the leading edges of the exposed and new sheets of film 11 and 9, respectively, a plurality of pairs 86 and 23 could be installed, occupying different positions in relation to the longitudinal axis of the main frame 38 and operated selectively, according to which pair is aligned with the leading edge of the current size of sheet. With this adjustable type of embodiment, it becomes possible to empty and reload different sizes of cassette 3 at given intervals, the size of film being selected simply by locating a magazine 8 full of new sheets 9 between the relative transverse stops 32 and 35.

What is claimed:

1. A compact automatic machine for emptying and reloading film from and into X-ray cassettes, comprising:
    a first cassette station, incorporating devices by means of which cassettes are admitted singly in succession, and ejected once reloaded, by means of devices mounted to and encompassed by a light-excluding main frame;
    a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame,
    wherein the device serving to pick up and transfer new film from the magazine comprises at least one flanged nozzle with radial orifices, connected to a source of compressed air and carried by an arm that is linked mechanically to one of the interconnected devices of the second station and rotatable between an at-rest position, in which the nozzle is distance from the magazine, and a working position, in which the nozzle gains the inside of the magazine and is held motionless with its flange offered to the leading edge of the new film during the initial movement made by the device in picking up at least the leading edge.

2. A compact automatic machine for emptying and reloading film from and into X-ray cassettes, comprising:
    a first cassette station, incorporating devices by means of which cassettes are admitted singly in succession, and ejected once reloaded, by means of devices mounted to and encompassed by a light-excluding main frame;
    a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame,
    wherein the respective devices serving to pick up and transfer exposed and new film each consist in at least one sucker, carried by one member of a respective articulated quadrilateral in such a way as to remain disposed substantially face-down, and capable of movement through arched trajectories between an intermediate at rest position, in which the quadrilateral is disposed substantially upright between the cassette and the magazine, a pick-up limit position, with the sucker disposed horizontally internally of the cassette, or the magazine, and a release limit position that coincides with the collection point, or with the inside of the cassette.

3. A machine as in claim 2, wherein the articulated quadrilateral of the device serving to pick up and transfer new film comprises:

two substantially upright longer members;

a first shorter member, pivotably anchored to the machine frame and connected to means, caused to operate when the relative sucker occupies the pickup limit position internally of the magazine, by which it is shifted initially from an at-rest limit position into an active limit position, whereupon the leading edge of the new film is lifted by the sucker, and then returned to the at-rest position;

a second shorter member, carrying the sucker, which exhibits a distance between centers greater than that of the first shorter member and is associated with spring means, serving to bias the sucker into the face-down position, and with camfollower means that are designed to enter into contact with a fixed cam profile during the descent trajectory toward the release limit position inside the cassette, and thus induce rotation of the sucker against the bias of the spring, or at all events, in the direction opposite to that described by the longer members, into a horizontal position.

4. A machine as in claim 1, wherein the device serving to pick up and transfer new film from the magazine consists in at least one sucker, carried by one member of a respective articulated quadrilateal in such a way as to remain substantially face-down, and capable of movement through arched trajectories between an intermediate at rest position, in which the quadrilateral is disposed substantially upright between the cassette and the magazine, a pick-up limit position, in which the sucker is disposed substantially horizontal inside the magazine, and a release limit position that coincides with the inside of the cassette, and wherein the articulated quadrilateral is comprised of:

two substantially upright longer members;

a first shorter member, pivotably anchored to the machine frame and connected to means, caused to operate when the relative sucker occupies the pickup limit position internally of the magazine, by which it is shifted initially from an at-rest limit position into an active limit position, whereupon the leading edge of the new film is lifted over the flange of the air nozzle by the sucker, and then returned to the at-rest position;

a second shorter member, carrying the sucker, which exhibits a distance between centers greater than that of the first shorter member and is associated with spring means, serving to bias the sucker into the face-down position, and with camfollower means that are designed to enter into contact with a fixed cam profile during the descent trajectory toward the release limit position inside the cassette and thus induce rotation of the sucker against the bias of the spring, or at all events, in the direction opposite to that described by the longer members, into a horizontal position.

5. A machine as in claim 4, wherein the distance between centers of rotation of the first shorter member is adjustable.

6. A compact automatic machine for emptying and reloading film from and into X-ray cassettes, comprising:

a first cassette station, incorporating devices by means of which cassettes are admitted singly in succession, and ejected once reloaded, by means of devices mounted to and encompassed by a light-excluding main frame;

a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer and exposed sheet of film from each open cassette to a collection point, and a device serving to pick up and transfer new film from the magazine to the empty open cassette, all of which interconnected by direct mechanical linkages, and mounted to and encompassed by a light excluding main frame, wherein the collection point consists in a bay for the accommodation of a tray designed to receive exposed film transferred from the single cassettes and provided with a lid that is opened and shut by a device connected through a direct mechanical linkage to the device which opens and shuts the magazine.

7. A compact automatic machine for emptying and reloading film from and into X-ray cassettes, comprising:

a first cassette station, incorporating devices by means of which cassettes are admitted singly in succession, and ejected once reloaded, by means of devices mounted to and encompassed by a light-excluding main frame;

a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame;

wherein the collection point consists in means for connection to the top end of a light-excluding chute, of which the remaining end connects with a developing machine.

8. A compact automatic machine for emptying and reloading film from and into X-ray cassettes, comprising:

a first cassette station, incorporating devices by means of which cassettes are admitted singly in succession, and ejected once reloaded, by means of devices mounted to and encompassed by a light-excluding main frame;

a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame, wherein the device by which the cassette is open and shut comprises:

an arm, suspended above and disposed parallel with the path of admission of the cassette;

means associated with the underside of the arm, by which to engage a handle afforded by the cassette;

a frame of upturned-U shape, supporting the arm, which is anchored pivotably by its two ends to the main frame of the machine and rotatable about a horizontal axis disposed transversely to the path of admission, connected mechanically on the one hand to means by which the device itself is driven, together with the devices that pick u and transfer the exposed and new film, and provided on the other with a downwardly extending projection the bottom end of which engages permanently with the top end of a lever, articulated in turn at bottom with one end of a horizontal rod the remaining end of which connects with and operates the device by which the magazine is open and shut.

9. A compact automatic machine for emptying and reloading film from and into X-ray cassettes, comprising:

a first cassette station, incorporating devices by means of which cassettes are admitted singly in succession, and ejected once reloaded, by means of devices mounted to and encompassed by a light-excluding main frame;

a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame, wherein the device serving to open and shut the single cassettes comprises blowing means, positioned by way of adjustment means in such a manner as to remain directed permanently across the inner surface of a lid of the cassette, and operated by control means on detection of an exposed film clinging to an inner surface of the lid, wherein the device by which the cassette is open and shut comprises:

a first arm, suspended above and disposed parallel with the path of admission of the cassette;

means associated with the underside of the arm, by which to engage a handle afforded by the cassette;

a frame of upturned-U shaped, supporting the arm, which is anchored pivotably by its two ends to the main frame of the machine and rotatable about a horizontal axis disposed transversely to the path of admission, connected mechanically on the one hand to means by which the device itself is driven, together with the devices that pick up and transfer the exposed and new film, and provided on the other with a downwardly extending projection the bottom end of which engages permanently with the top end of a lever, articulated in turn at bottom with one end of a horizontal rod the remaining end of which connects with and operates the device by which the magazine is open and shut;

a second arm, pivotably mounted at one end to the upturned-U frame so as to rotate about an axis parallel to the axis of rotation of the frame, and extending parallel with the path of admission of the cassette, the projecting end of which carries the blowing means;

adjustable depth stop means, associated with the second arm and designed to enter into contact with the lid of the cassette;

travel-limiting means, associated with the second arm and designed to operate in the absence of a cassette.

10. A compact automatic machine for emptying and reloading film from and into X-ray cassettes, comprising:

a first cassette station, incorporating devices by means of which cassettes are admitted singly in succession, and ejected once reloaded, by means of devices mounted to and encompassed by a light-excluding main frame;

a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame, wherein the bay occupied by the magazine incorporates one adjustable stop, engaged by the leading edge of the magazine on its introduction into the machine and driven forward along the path of introduction by a magazine of dimensions greater than those of a given minimum size of film, and a fixed stop engaged by the rear edge of the magazine; and wherein the stop engaged by the cassette at the second station is afforded by a pair of parallel side fences connected mechanically to the adjustable stop in such a way that movement of the adjustable stop away from an at-rest position, parallel with itself, causes them to shift away from the first station and spread apart, thereby creating a space sufficient to accommodate a cassette containing exposed film of the same size as the new film contained in the magazine of greater dimensions.

11. A machine as in claim 6, wherein the bay occupied by the magazine incorporates one adjustable stop, engaged by the leading edge of the magazine on its introduction into the machine and driven forward along the path of introduction by a magazine of dimensions greater than those of a given minimum size of film, and a fixed stop engaged by the rear edge of the magazine; and wherein the adjustable stop is connected mechanically to a first pair of parallel fences affording the stop engaged by the cassette at the second station, and with a second pair of parallel fences incorporated into the collection point and flanking the collection tray, in such a way that movement of the adjustable stop away from an at-rest position, parallel with itself, causes each pair of fences to shift forward and spread apart, thereby creating space sufficient to accommodate a cassette, and a collection tray, respectively, containing exposed film of the same size as the new film contained in the magazine of greater dimensions.

12. A compact automatic machine for emptying and reloading film from and into X-ray cassettes, comprising:
- a first cassette station, incorporating devices by means of which cassettes are admitted singly in succession, and ejected once reloaded, by means of devices mounted to and encompassed by a light-excluding main frame;
- a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame,
- further comprising a freely revolving roller, located between the first and second stations, or near to either the first or the second station, which is faced with especially soft material and capable of rising vertically and descending under its own weight to the point of making contact at bottom with a shelf, or with a cassette moving along the shelf.

13. A compact automatic machine for emptying and reloading film from and into X-ray cassettes, comprising:
- a first cassette station, incorporating devices by means of which cassettes are admitted singly in succession, and ejected once reloaded, by means of devices mounted to and encompassed by a light-excluding main frame;
- a second cassette station located adjacent to said first station, having a stop located internally in the machine for locating a cassette received from said first station in said second station, incorporating a device serving to open and shut the cassette occupying the machine, a device serving to open and shut a magazine from which sheets of new film are dispensed, a device serving to pick up and transfer an exposed sheet of film from each open cassette to a collection point, and a device serving to pick up and transfer new film from the magazine to the empty open cassette, all of which interconnected by direct mechanical linkages, and mounted to and encompassed by a light excluding main frame;
- further comprising, at least:
  - first sensing means, positioned along the trajectory described by new film transferred from the magazine and designed to relay a signal to monitoring and control means on detecting a degree of transparency less than that corresponding to one sheet of new film;
  - second sensing means, positioned near to the stop engaged by the cassette and trained onto the inner surface of the open lid of the cassette, designed to relay a first signal to the monitoring and control means, in the event of an initial failure to detect a reflecting surface afforded by the inner surface of the lid, and to relay a second signal in the event of a repeated failure;
  - third sensing means, positioned near to the stop engaged by the cassette, designed to throw a beam of light across the trajectory described by the lid of the cassette and to relay a signal to the monitoring and control means in the event that the beam is not broken by the lid;
  - fourth sensing means trained onto the bottom of the cassette from above, designed to effect at least two operations per cycle, timed in relation to the movements of the open/shut devices and of the pick-up and transfer devices, which relay a first signal to the monitoring and control means on failure to detect a reflecting surface afforded by the lid of the cassette, and a second signal on detection of a reflecting surface afforded by the bottom of the cassette;
  - fifth sensing means, trained on the interior of the magazine and designed to relay a signal to the monitoring and control means on full or part detection of a reflecting surface afforded by the interior;
  - sixth sensing means, positioned near to the collection point and designed to relay a signal to the monitoring and control means on detection of a given number of exposed sheets of film;
- wherein monitoring and control means comprise:
  - error indication means located externally of the machine, activation of which may be triggered by a signal from any one of the six sensing means;
  - means totally inhibiting operation of the machine, activation of which may be triggered by a signal from the fifth or sixth sensing means;
  - means serving to inhibit movement of the open/shut devices and the pick-up and transfer devices and to activate means for ejection of the cassette from the machine, activation of which may be triggered by a first signal from the fourth sensing means, by a signal from the third sensing means, or by a second signal from the second sensing means;
  - means inhibiting operation of the device by which new film is picked up and transferred, activation of which may be triggered by a signal from the first sensing means or by a second signal from the fourth sensing means;
  - blowing means, directed substantially toward the inner surface of the lid of the cassette, operation of which is triggered by a first signal from the second sensing means.

* * * * *